(12) United States Patent
Banka et al.

(10) Patent No.: US 11,765,014 B2
(45) Date of Patent: *Sep. 19, 2023

(54) INTENT-BASED DISTRIBUTED ALARM SERVICE

(71) Applicant: Juniper Networks, Inc., Sunnyvale, CA (US)

(72) Inventors: Tarun Banka, Milpitas, CA (US); Aditi Ghotikar, Sunnyvale, CA (US); Gauresh Dilip Vanjare, Santa Clara, CA (US); Harshit Naresh Chitalia, Mountain View, CA (US); Rajenkumar Patel, Sunnyvale, CA (US); Yixiao Wei, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,383

(22) Filed: Mar. 31, 2022

(65) Prior Publication Data

US 2022/0224586 A1 Jul. 14, 2022

Related U.S. Application Data

(63) Continuation of application No. 16/947,927, filed on Aug. 24, 2020, now Pat. No. 11,336,504.

(51) Int. Cl.
*H04L 41/06* (2022.01)
*H04L 41/0681* (2022.01)
(Continued)

(52) U.S. Cl.
CPC .......... *H04L 41/0604* (2013.01); *H04L 41/06* (2013.01); *H04L 41/0681* (2013.01); *H04L 41/16* (2013.01)

(58) Field of Classification Search
None
See application file for complete search history.

(56) References Cited

U.S. PATENT DOCUMENTS 11,336,504 B2 * 5/2022 Banka ..................... H04L 43/20
2004/0117407 A1 6/2004 Kumar et al.
(Continued)

FOREIGN PATENT DOCUMENTS

EP 3382543 A1 10/2018

OTHER PUBLICATIONS

Extended Search Report from counterpart European Application No. 20207488.6, dated May 3, 2021, 8 pp.
(Continued)

*Primary Examiner* — Joshua Joo
(74) *Attorney, Agent, or Firm* — Shumaker & Sieffert, P.A.

(57) ABSTRACT

An alarm service can receive an alarm rule as an "intent" that defines a rule in a high level "natural language." An alarm rule compiler can receive the intent and translate the high level intent into one or more lower level rules that can be programmatically processed by multiple alarm rule execution engines. Devices in a network system can be associated with alarm rule execution engines in a distributed manner. For example, devices in a network can be associated with different instances of an alarm rule execution engine, thus distributing the resource usage for obtaining telemetry data and processing alarms with respect to the devices in a network across multiple alarm rule execution engines.

16 Claims, 12 Drawing Sheets

(51) Int. Cl.
  *H04L 41/0604* (2022.01)
  *H04L 41/16* (2022.01)

(56) References Cited

U.S. PATENT DOCUMENTS

| | | | |
|---|---|---|---|
| 2013/0007265 A1 | 1/2013 | Benedetti et al. | |
| 2015/0089077 A1* | 3/2015 | Acharya | H04L 65/612 |
| | | | 709/231 |
| 2016/0112240 A1 | 4/2016 | Sundaresan et al. | |
| 2016/0162320 A1 | 6/2016 | Singh et al. | |
| 2016/0254981 A1 | 9/2016 | Kimura et al. | |
| 2016/0373352 A1* | 12/2016 | Sharma | H04L 45/64 |
| 2017/0331669 A1 | 11/2017 | Ganesh et al. | |
| 2017/0353367 A1 | 12/2017 | Slaight et al. | |
| 2018/0209679 A1 | 7/2018 | Bon et al. | |
| 2018/0262454 A1* | 9/2018 | Zandi | H04L 51/214 |
| 2018/0278459 A1 | 9/2018 | Prasad et al. | |
| 2018/0285166 A1* | 10/2018 | Roy | G06F 9/5016 |
| 2018/0359184 A1* | 12/2018 | Inbaraj | H04Q 9/02 |
| 2018/0367428 A1 | 12/2018 | Di Pietro et al. | |
| 2019/0280940 A1 | 9/2019 | Furuichi et al. | |
| 2019/0342178 A1* | 11/2019 | Balasubramanian | G06N 5/00 |
| 2020/0028701 A1 | 1/2020 | Liu et al. | |
| 2020/0045124 A1* | 2/2020 | Wayama | H04L 41/0226 |
| 2020/0220780 A1 | 7/2020 | Prasad et al. | |
| 2020/0252264 A1 | 8/2020 | Arora et al. | |
| 2020/0304367 A1* | 9/2020 | Berdy | H04L 12/2803 |
| 2020/0389361 A1 | 12/2020 | Vu et al. | |
| 2021/0092006 A1* | 3/2021 | Estrada | H04L 41/0631 |
| 2021/0200530 A1* | 7/2021 | Rusev | H04L 43/04 |
| 2021/0210217 A1 | 7/2021 | Xu et al. | |
| 2022/0058042 A1 | 2/2022 | Vanjare et al. | |
| 2022/0060369 A1 | 2/2022 | Banka et al. | |

OTHER PUBLICATIONS

Kompella et al., "Detection and Localization of Network Black Holes," IEEE INFOCOM 2007—26th IEEE International Conference on Computer Communications, May 6-12, 2007, 9 pp.

Prosecution History from U.S. Appl. No. 16/947,927, dated Oct. 12, 2021 through Apr. 14, 2022, 40 pp.

Response to Extended Search Report dated Sep. 1, 2022, from counterpart European Application No. 20207488.6 filed Nov. 13, 2020, 21 pp.

* cited by examiner

```
{'metric': {'labels': {'aggregation_function': 'sum',
                       'alarm_id': 'interface_device_id_2',
                       'alarm_name': 'interface_device_id',
                       'application_id': 'app1',
                       'comparison_function': 'above',
                       'description': 'interface_device_id',
                       'entity_name': 'lc-1/0/0',
                       'entity_type': 'interface',
                       'interval_duration': '1',
                       'intervals_with_exception': '1',
                       'mode': 'alert',
                       'monitoring_intervals': '1',
                       'network_device': 'vmx4',
                       'network_device_id': 'vmx4',
                       'network_device_name': 'vmx4',
                       'sample_value': '1.0',
                       'severity': 'info',
                       'source_protocol': 'netconf',
                       'state': 'active',
                       'tenant_id': 'beef-beef-beef-003',
                       'threshold': '0',
                       'threshold_type': 'static'},
            'type': '/network_device/interface/operational_status'},
 'metric_kind': 'GAUGE',
 'points': [{'interval': {'end_time': '2020-02-20T20:09:53Z'},
             'value': {'string_value': 'active'}}],
 'value_type': 'STRING'}
```

FIG. 8

| API | DESCRIPTION | INPUT | RETURN |
|---|---|---|---|
| CreateAlarmRule | Create alarm rule | { ApplicationId: <><br>AlarmName: <><br>AlarmRuleScope: <><br>MetricType:<br>  </network_device/interface/ingress_bit_rate><br>ResourceSelectors: [<br>  Network_device: []<br>  Interface: []<br>],<br>ProcessingParameters: {<br>  Aggr_function:<br>    <aggregation function>,<br>  Comparison_function: <above, below, max, min ><br>  N: <Number of Intervals with Exception>,<br>  M: <Number of monitoring interval buckets>,<br>  Duration: <Monitoring time interval><br>  Threshold: <Threshold for time-series metric><br>    ThresholdType: 'static or dynamic'}<br>AlarmMode: <alert, event><br>Description: <>,<br>Severity: <><br>NotificationInfo: <Slack, PagerDuty><br>}<br>} | JobId,<br>AlarmId |
| DeleteAlarmRule | Delete alarm rule | {AlarmRuleId: <>} | JobId |
| GetAlarmRule | Get specific alarm rule | {AlarmRuleId: <>} | Alarm Rule Definition |
| ListAllAlarmRules | List all alarm rules | <optional filters><br>NetworkDeviceId,<br>Severity | List of Alarm Rule definitions |
| EnableAlarmRule | Enable Existing Rule | {AlarmRuleId: <>} | JobId |
| DisableAlarmRule | Disable Existing Rule | {AlarmRuleId: <>} | JobId |

FIG. 9A

| Field Name | Required /Optional Param | Description |
|---|---|---|
| Name | Required | Name of Alarm |
| MetricType | Required | Metric for which alarm is defined, e.g., /network_device/interface/ingress_bit_rate |
| ResourceSelectors | Required | Defines Resource labels in MetricType, e.g.<br><br>{ 'ResourceScope': 'network_device'<br>'ResourceIds': ['ND1']<br>'EntityType': 'interface'<br>'EntityNameList': ['Gi0/1/0', 'Gi0/1/1']<br>}<br><br>OR<br><br>For all network devices, rules can be specified like below.<br><br>{<br>'ResourceScope': 'network_device'<br>'ResourceIds': []<br>'EntityType': None<br>'EntityNameList': []<br>} |
| Description | Optional | Describes alarm in detail |
| Mode | Required | Alert Mode (stateful),<br>Event Mode (stateless) |
| NotificationInfo | Optional | Notification option for alarms<br><br><slack, pagerDuty, CustomUrl> |
| Severity | Optional | critical,<br>normal,<br>warning,<br>informational |
| ProcessingParameters | Required | Parameters that defines conditions for alarm generation |
|   AggregationFunction | Required | sum,<br>average,<br>min,<br>max,<br>std-dev,<br>count |
|   ComparisonFunction | Required | above,<br>below,<br>equal,<br>above_equal,<br>below_equal, increasing-at-minimum-rate,<br>decreasing-at-minimum-rate |
|   MonitoringIntervals | Required | Total number of intervals in a window |
|   IntervalsWithException | Required | Minimum number of intervals that need to be anomalous out of monitoring_intervals |
|   IntervalDuration | Required | Duration in seconds of one monitoring interval |
|   Threshold | Required* | Required for Static Rules |
|     ThresholdType | Required | 'static' or 'dynamic' |

FIG. 9B

| API Name | Description | Input | Return |
|---|---|---|---|
| CreateAlarmSubscription | Subscribe for alarm notification | {ApplicationId: <>, AlarmIdList: [], OR 'Severity': " } | Alarm Notifications and AlarmSubscriptionId |
| UpdateAlarmSubscription | Update Existing Subscription | {ApplicationId: <> AlarmSubscriptionId: <> AlarmIdList: <> UpdateType: <append or delete>, } | (Not required) |
| DeleteAlarmSubscription | Delete alarm notification | {ApplicationId: , AlarmSubscriptionId: } | (Not required) |
| GetActiveAlarms | Get list of all alarms with provided filter(e.g. metric type or metric label) that are active since start time | { ApplicationId:, FilterList: [<filter_key, filter_value>] StartTime: <optional> } | List of Active Alarms since startTime in UTCseconds |
| GetAlarms | Get list of all alarms with provided filter(e.g. metric type or metric label) since start time | { ApplicationId:, FilterList: [<filter_key, filter_value>] StartTime } | List of alarms since startTime in UTC seconds |
| GetEvents | Get list of all events with provided filter(e.g. metric type or metric label) since start time | { ApplicationId:, FilterList: [<filter_key, filter_value>] StartTime } | List of events since the start time in UTC seconds. |

FIG. 10

| Microservice | Health Metrics per microservice instance | Rule for Scale Out and Scale Down |
|---|---|---|
| Alarm Rule Intent Compiler | CpuUsage<br>MemoryUsage<br>AlarmIntentCount<br>AlarmRuleIntentAddRate<br>AlarmRuleIntentDeleteRate | For each of the health metric following rules are defined. Note that depending on the metrics some scale out signals may have higher weightage over other.<br><br>If <Metric> is above <threshold> for N monitoring windows of duration <D> seconds then Scale Out |
| | | If <Metric> is below <threshold> for N monitoring windows of duration <D> seconds then scale down |
| Alarm Intent Programming | CpuUsage<br>MemoryUsage<br>AlarmRuleInstanceCount<br>AlarmRulePeningRules<br>AlarmRuleProgammingLatency | Same as above |
| Alarm Execution Engine | CpuUsage<br>MemoryUsage<br>AlarmRuleInstanceCount<br>AlarmRuleExecutionLatency<br>AlarmRuleDataQueueSize<br>AlarmRuleConfigQueueSize<br>AlarmRuleNotificationRate<br>AlarmRuleStaleCount | Same as above |
| Alarm Data Adapter | CpuUsage<br>MemoryUsage<br>AlarmNotificationIngressRate<br>AlarmNotificationEgressRate<br>AlarmNotificationQueueSize | Same as above |
| Alarm Subscription Service | CpuUsage<br>MemoryUsage<br>ActiveSubscriberCount<br>ActiveGrpcChannelCount<br>TotalSubscriptionKeyCount<br>RedisChannelCount | Same as above |

FIG. 11

INTENT-BASED DISTRIBUTED ALARM SERVICE

This application is a continuation of U.S. patent application Ser. No. 16/947,927, filed 24 Aug. 2020, the entire contents of which is incorporated herein by reference.

TECHNICAL FIELD

This disclosure relates to computer networks and, more specifically, to anomaly detection in computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides.

Supporting virtualization in large scale data center can require numerous network devices and host devices that can be coupled together in a data center network. Additionally, network devices in a data center may be allocated to different tenants. Configuring devices to generate data used for anomaly detection and alarm generation can be difficult given the large number of network devices, different types of network devices, and different tenants that may be present in a data center.

SUMMARY

This disclosure describes techniques for providing a sharable alarm service to perform anomaly detection and alarm generation for cloud infrastructure monitoring that can be used by multiple applications and tenants at a cloud scale.

An administrator can express an alarm rule as an "intent" that defines a rule in a high level "natural language." An alarm rule compiler can receive the intent and translate the high level intent into one or more lower level rules that can be programmatically processed by multiple alarm rule execution engines. In some aspects, devices in a network system can be associated with alarm rule execution engines in a distributed manner. For example, devices in a network can be associated with different instances of an alarm rule execution engine, thus distributing the resource usage for obtaining telemetry data and processing alarms with respect to the devices in a network across multiple alarm rule execution engines.

The techniques described herein may provide one or more technical advantages. For example, the techniques may facilitate the use of alarm rule execution engines that may be implemented as microservices, and that may be fault tolerant and scalable. As a result, the alarm service can be easily scaled to meet variations in the number of devices in use by a network system. In addition to scalability, the alarm service is easy to use by network administrators, because the administrator can express an intent in a high level natural language, and the alarm service can translate the administrator's intent into lower level rules that define the devices and metrics that need to be accessed in order to implement the administrator's intent.

In one example, a method includes allocating, by one or more processors, a plurality of devices among a plurality of instances of an alarm rule execution engine; receiving, by the one or more processors, data representing an alarm intent; translating, by the one or more processors, the data representing the alarm intent into one or more rules, the one or more rules specifying alarm criteria for respective alarms for the one or more rules; determining, by the one or more processors, a set of devices of the plurality of devices that are specified by the one or more rules; assigning, by the one or more processors, the one or more rules to respective instances of the plurality of instances of the alarm rule execution engine to which the set of devices has been allocated, wherein each respective instance of the alarm rule execution engine is configured to apply the one or more rules to the devices of the set of devices allocated to the respective instance of the alarm rule execution engine; registering the set of devices specified by the one or more rules with a telemetry service, wherein the set of devices provide telemetry data in response to the registering; subscribing, by the respective instances of the plurality of instances of the alarm rule execution engine, to the telemetry data to obtain the telemetry data; and in response to determining, by the respective instances of the plurality of instances of the alarm rule execution engine based on the one or more rules, that the telemetry data matches an alarm criteria for a rule of the one or more rules, outputting an indication of the alarm for the rule.

In another example, an alarm service system includes an alarm controller executable by one or more processors and configured to allocate a plurality of devices among a plurality of instances of an alarm rule execution engine; an alarm intent compiler executable by the one or more processors and configured to: receive data representing an alarm intent, translate the data representing the alarm intent into one or more rules, the one or more rules specifying alarm criteria for respective alarms for the one or more rules, and determine a set of devices of the plurality of devices that are specified by the one or more rules; and an alarm rule programmer executable by the one or more processors and configured to assign the one or more rules to respective instances of the plurality of instances of the alarm rule execution engine to which the set of devices has been allocated, wherein each respective instance of the alarm rule execution engine is configured to apply the one or more rules to the devices of the set of devices allocated to the respective instance of the alarm rule execution engine; wherein the alarm rule controller is further configured to register the set of devices specified by the one or more rules with a telemetry service, wherein the set of devices provide telemetry data in response to the registering; wherein the one or more respective instances of the plurality of instances of the alarm rule execution engine are further configured to: subscribe to the telemetry data to obtain the telemetry data, and in response to a determination, by the respective instances of the plurality of instances of the alarm rule execution engine based on the one or more rules, that the telemetry data matches an alarm criteria for a rule of the one or more rules, outputting an indication of the alarm for the rule.

In a further example, a computer-readable storage medium includes instructions that, when executed, cause processing circuitry of a computing system to: allocate a plurality of devices among a plurality of instances of an alarm rule execution engine; receive data representing an alarm intent; translate the data representing the alarm intent into one or more rules, the one or more rules specifying alarm criteria for respective alarms for the one or more rules; determine a set of devices of the plurality of devices that are specified by the one or more rules; assign the one or more rules to respective instances of the plurality of instances of the alarm rule execution engine to which the set of devices has been allocated, wherein each respective instance of the alarm rule execution engine is configured to apply the one or more rules to the devices of the set of devices allocated to the respective instance of the alarm rule execution engine; register the set of devices specified by the one or more rules with a telemetry service, wherein the set of devices provide telemetry data in response to the registration; subscribe, by the respective instances of the plurality of instances of the alarm rule execution engine, to the telemetry data to obtain the telemetry data; and in response to a determination, by the respective instances of the plurality of instances of the alarm rule execution engine based on the one or more rules, that the telemetry data matches an alarm criteria for a rule of the one or more rules, output an indication of the alarm for the rule.

The details of one or more techniques of the disclosure are set forth in the accompanying drawings and the description below. Other features, objects, and advantages of the invention will be apparent from the description and drawings, and from the claims.

BRIEF DESCRIPTION OF THE DRAWINGS

FIG. 8 is a conceptual diagram illustrating normalized alarm data in accordance with one or more aspects of the present disclosure.

FIG. 9A illustrates an API for an alarm service controller in accordance with one or more aspects of the present disclosure.

FIG. 9B illustrates parameters associated with the API of FIG. 9A, in accordance with one or more aspects of the present disclosure.

FIG. 10 illustrates an API for receiving historical and real-time alarm notifications in accordance with one or more aspects of the present disclosure.

FIG. 11 illustrates rules and health metrics that can be used for scaling up or down various components and services of an alarm service in accordance with one or more aspects of the present disclosure.

DETAILED DESCRIPTION

Data centers that use virtualized environments in which virtual hosts, virtual machines, or containers are deployed and executed on an underlying compute platform of physical computing devices provide efficiency, cost, and organizational advantages. A typical data center employs numerous network devices and host devices that are used to support the virtualized environment and enable communication between entities both within the data center and external to the data center. Monitoring the numerous devices in a data center for anomalies may be useful in efficiently managing a data center fabric. Further, monitoring the devices in a data center for anomalies may facilitate early detection and resolution of problems, thus increasing user satisfaction with the data center. Telemetry data from networking devices and host devices may facilitate detection of anomalies.

In some cases, collecting sufficient data from network devices to facilitate anomaly detection can be a challenge, particularly given the number of network devices and host devices in a network and the variety of different network devices and host devices in the network. It can be difficult for a network administrator to master all of the different commands or application program interfaces (APIs) that may be necessary to collect telemetry data from the devices in a network.

Techniques are described herein to enable a network administrator to indicate the administrator's intent with respect to obtaining telemetry data for devices in a network. The administrator's intent can be translated into one or more lower level rules that conform to different protocols and metrics that can be obtained from network devices. Further, the techniques described herein can facilitate an alarm service that can be readily scaled up as the network grows.

Figure 1:
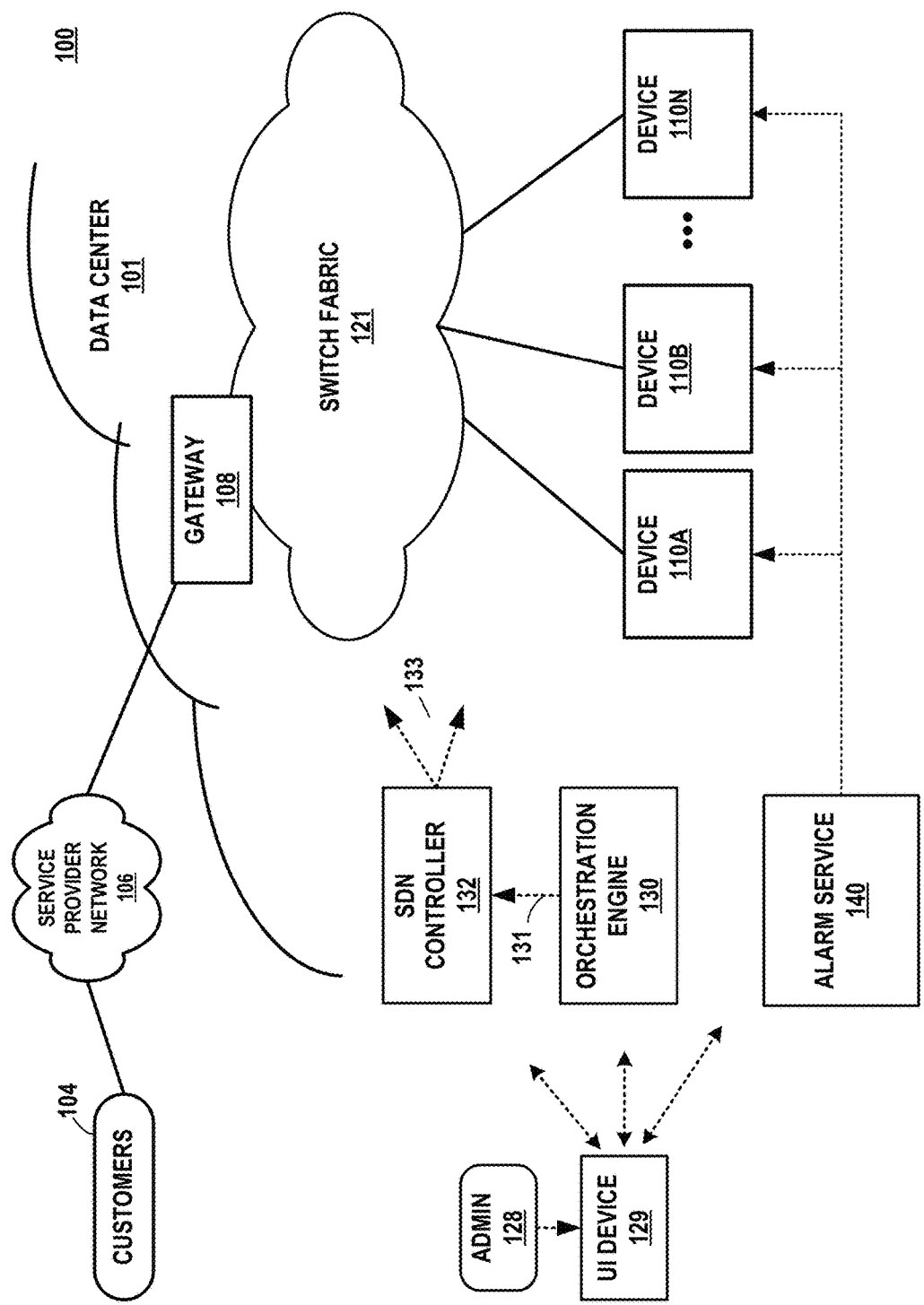
FIG. 1 is a conceptual diagram illustrating an example network that includes an intent based alarm service, in accordance with one or more aspects of the present disclosure.

FIG. 1 is a conceptual diagram illustrating an example network that includes an anomaly detection service 140 in a network, for example, a network within a data center, in accordance with one or more aspects of the present disclosure. FIG. 1 illustrates one example implementation of a network system 100 and a data center 101 that hosts one or more computing networks, computing domains or projects, and/or cloud-based computing networks. Network system 100 may include one or more cloud-based computing clusters that may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments, collections of bare metal servers, Contrail or Tungsten clusters, or other computing clusters, domains, networks and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on.

In the example of FIG. 1, data center 101 includes a set of storage systems, application servers, compute nodes, or other devices, including device 110A through device 110N (collectively "devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration.

Devices 110 may be any of a number of different types of network devices (core switches, spine network devices, leaf network devices, edge network devices, or other network devices), but in some examples, one or more devices 110 may serve as physical compute nodes and/or storage nodes of the data center. For example, one or more of devices 110 may provide an operating environment for execution of one or more customer-specific applications or services. Alternatively, or in addition, one or more of devices 110 may provide an operating environment for one or more virtual machines or other virtualized instances, such as containers. In some examples, one or more of devices 110 may be alternatively referred to as a host computing device or, more simply, as a host. A device 110 may thereby execute one or more virtualized instances, such as virtual machines, containers, or other virtual execution environment for running one or more applications or services, such as virtualized network functions (VNFs).

In general, each of devices 110 may be any type of device that may operate on a network and which may generate data (e.g. connectivity data, flow data, sFlow data, resource utilization data) accessible through telemetry or otherwise, which may include any type of computing device, sensor, camera, node, surveillance device, or other device. Further, some or all of devices 110 may represent a component of another device, where such a component may generate data collectible through telemetry or otherwise. For example, some or all of devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to send and receive packets between switch fabric 121 and service provider network 106.

In some examples, orchestration engine 130 manages functions of data center 101 such as compute, storage, networking, and application resources. Orchestration engine 130 may implement a security policy across a group of VMs or to the boundary of a tenant's network. Orchestration engine 130 may deploy a network service (e.g. a load balancer) in a tenant's virtual network.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestration engine 130 via northbound application programming interface (API) 131, which in turn may operate in response to configuration input received from an administrator 128 interacting with and/or operating user interface device 129. SDN controller 132 may create a virtual network for a tenant within data center 101 or across data centers. SDN controller 132 may attach virtual machines (VMs) to a tenant's virtual network. SDN controller 132 may connect a tenant's virtual network to an external network, e.g. the Internet or a VPN.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g. top-of-rack (TOR) switches, chassis switches, and switch fabric 121; physical routers; physical service nodes such as firewalls and load balancers; and virtual services such as virtual firewalls in a VM. SDN controller 132 maintains routing, networking, and configuration information within a state database. Different cloud computing clusters may have separate instances of SDN controller 132.

Alarm service 140 can configure devices 110 (and/or other devices) to collect and provide telemetry data related to the operations of devices 110. Such data can include process usage data, memory usage data, network usage data, error counts etc. Alarm service 140 can be configured with rules to determine if an alarm is to be generated based on the telemetry data. Applications, processes, threads etc. can subscribe to the alarm in order to be notified when an alarm is triggered based on current conditions on a device or devices on a network.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 132. In such examples, user interface device 129 may communicate with controller 132 over a network or other means of communication. In other examples, user interface device 129 may be a local peripheral of controller 132, or may be integrated into controller 132.

Further, user interface device 129 may communicate with alarm service 140 or a component thereof to configure the alarm service 140 to configure alarms using high-level statements of intent and to receive alerts, logs, or other data from devices 110 and other components of data center 101.

In accordance with techniques of this disclosure, alarm service 140 can provide a sharable alarm service to perform anomaly detection and alarm generation for cloud infrastructure monitoring that can be used by multiple applications and tenants at a cloud scale.

An administrator 128 can utilize UI device 129 to input data expressing an alarm rule as an "intent" that defines a rule in a high level "natural language" Alarm service 140 can receive the data representing the intent and translate the high level intent into one or more lower level rules that can be programmatically processed by multiple alarm rule execution engines of alarm service 140. In some aspects, devices 110 in a network system can be associated with the alarm rule execution engines in a distributed manner. For example, devices 110 in a network can be associated with different instances of an alarm rule execution engine, thus distributing the resource usage for obtaining telemetry data and processing alarms with respect to the devices in a network across multiple alarm rule execution engines.

Figure 2:
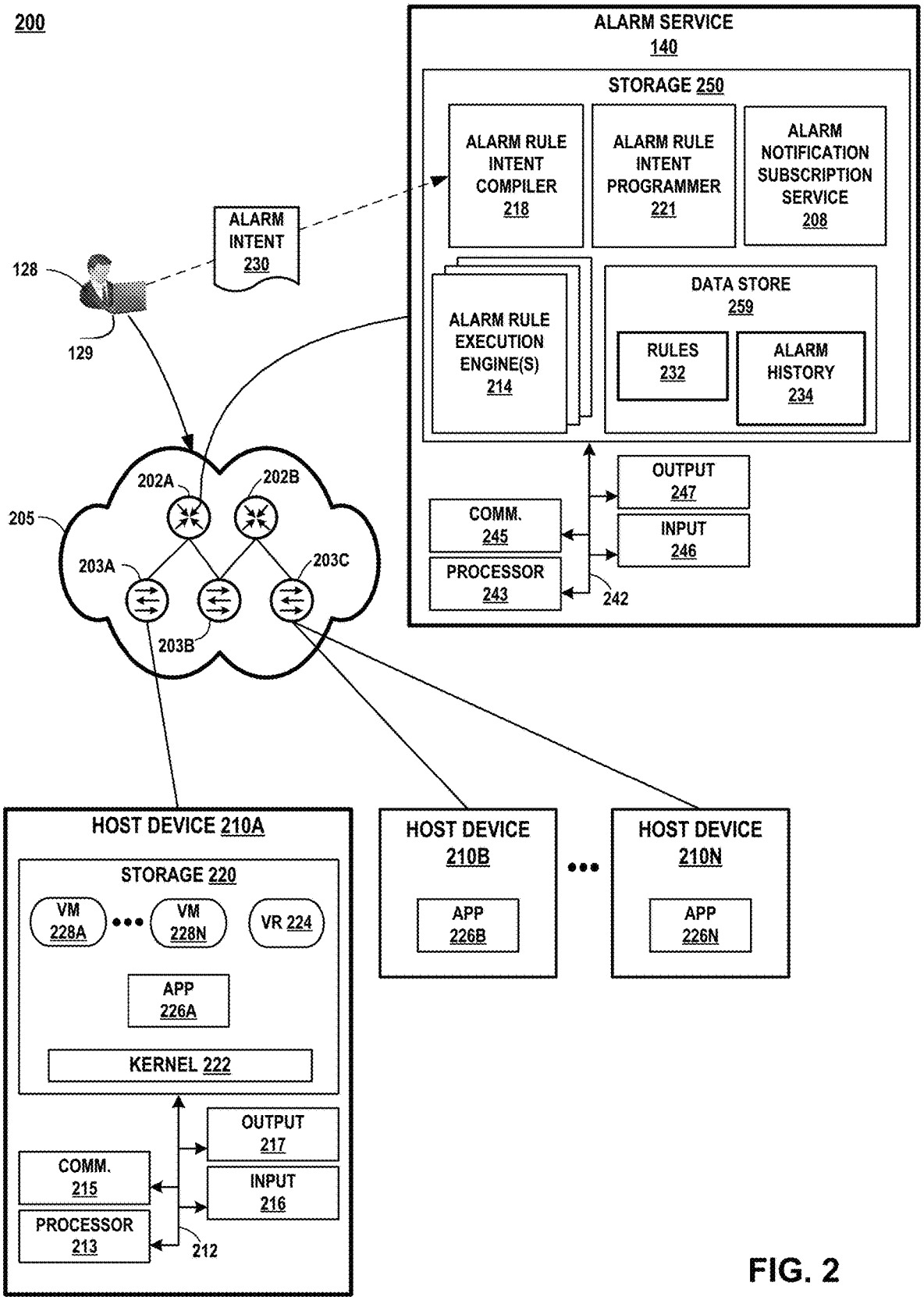
FIG. 2 is a block diagram illustrating an example system including an alarm service in a network and/or within a data center, in accordance with one or more aspects of the present disclosure.

FIG. 2 is a block diagram illustrating an example system including an alarm service in a network and/or within a data center, in accordance with one or more aspects of the present disclosure. Network system 200 of FIG. 2 may be described as an example or alternative implementation of network system 100 of FIG. 1. One or more aspects of FIG. 2 may be described herein within the context of FIG. 1.

Although a data center, such as that illustrated in FIG. 1 and FIG. 2 may be operated by any entity, some data centers are operated by a service provider, where the business model of such a service provider may involve providing computing capacity to customers or clients. For this reason, data centers usually contain a huge number of compute nodes, or host devices. In order to operate efficiently, those hosts have to be connected to each other and to the external world, and that ability is provided through physical network devices, which may be interconnected in a leaf-spine topology. The collection of these physical devices, such as network devices and hosts, form the underlay network.

Each host device in such a data center may have several virtual machines running on it, which may be referred to as workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience network issues such as increased latency, packet loss, low network throughput, or slow workload processing. Troubleshooting such issues may be complicated by the deployment of workloads in a large multitenant data center.

In the example of FIG. 2, network 205 connects alarm service 140, host device 210A, and host devices 210B—210N. Alarm service 140 may correspond to an example or alternative implementation of alarm service 140 illustrated in FIG. 1. Host devices 210A, 210B, through 210N may be collectively referenced as "host devices 210," representing any number of host devices 210.

Each of host devices 210 may be an example of devices 110 of FIG. 1, but in the example of FIG. 2, each of host devices 210 is implemented as a server or host device that operates as a physical or virtualized compute node or a storage node of a virtualized data center, as opposed to a network device. As further described herein, one or more of host devices 210 (e.g., host device 210A of FIG. 2) may execute multiple virtual computing instances, such as virtual machines 228, and in addition, one or more of host devices 210 (e.g., one or more of host devices 210B through 210N) may execute applications or service modules on a non-virtualized, single-tenant, and/or bare metal server. Accordingly, as in FIG. 1, the example of FIG. 2 illustrates a network system that may include a mix of virtualized server devices and bare metal server devices.

Also connected to network 205 is user interface device 129, which may be operated by administrator 128, as in FIG. 1. In some examples, user interface device 129 may present, at a display device associated with user interface device 129, one or more user interfaces.

Network 205 may correspond to any of switch fabric 121 and/or service provider network 106 of FIG. 1, or alternatively, may correspond to a combination of switch fabric 121, service provider network 106, and/or another network. Although not shown in FIG. 2, network 205 may also include some of the components of FIG. 1, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of network devices may be included in network 205, including core switches, edge network devices, top-of-rack devices, and other network devices.

In general, network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Each of host devices 210 represents a physical computing device or compute node or storage node that provides an execution environment for virtual hosts, virtual machines, containers, and/or other real or virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include like-numbered components that may represent the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes one or more processors 213, one or more communication units 215, one or more input devices 216, one or more output devices 217, and one or more storage devices 220. In the example shown, storage devices 220 may include kernel module 222 and virtual router module 224. Storage devices 220 may also include virtual machines 228A through 228N (collectively "virtual machines 228" and representing any number of virtual machines 228), when present, may execute on top of a hypervisor (not shown) or may be controlled by a hypervisor. One or more of the devices, modules, storage areas, or other components of host device 210A may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Processor 213 may implement functionality and/or execute instructions associated with host device 210A. Communication unit 215 may communicate with other devices or systems on behalf of host device 210A. One or more input devices 216 and output devices 217 may represent any other input and/or output devices associated with host device 210A. Storage devices 220 may store information for processing during operation of host device 210A. Each of such components may be implemented in a manner similar to those described herein in connection with alarm service 140 or otherwise.

Virtual router module 224 may execute multiple routing instances for corresponding virtual networks within data center 101 (FIG. 1) and may route packets to appropriate virtual machines executing within the operating environment provided by devices 110. Virtual router module 224 may also be responsible for collecting overlay flow data, such as Contrail Flow data when used in an infrastructure in which the Contrail SDN is employed.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition virtual and/or physical address space provided by storage device 220 into kernel space, which is protected and may be inaccessible by user processes.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines (e.g., one or more of host devices 210B through 210N, such as host device 210B and host device 210N). Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

In the example of FIG. 2, alarm service 140 may include one or more processors 243, one or more communication units 245, one or more input devices 246, one or more output devices 247 and one or more storage devices 250. Storage devices 250 may include alarm rule intent programming interface 221, alarm rule intent compiler 218, alarm notification subscription service 208, alarm rule execution engines 214 and data store 259.

One or more of the devices, modules, storage areas, or other components of alarm service 140 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

One or more processors 243 of alarm service 140 may implement functionality and/or execute instructions associated with alarm service 140 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device.

One or more communication units 245 of alarm service 140 may communicate with devices external to alarm service 140 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of alarm service 140 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of alarm service 140 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within alarm service 140 may store information for processing during operation of alarm service 140. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of alarm service 140 and/or one or more devices or systems illustrated as being connected to alarm service 140.

In some examples, one or more storage devices 250 are implemented through temporary memory, which may mean that a primary purpose of the one or more storage devices is not long-term storage. Storage devices 250 of alarm service 140 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Alarm rule intent compiler 218 receives an alarm intent 230 that expresses, at a high level, an intent for alarm generation and translates the alarm intent into one or more lower level alarm rules that implement the alarm intent 230. The alarm intent 230 may be in a natural language. As an example, an alarm intent 230 may be "Notify if CPU and Network Usage deviates from normal behavior in a cluster." In this example, alarm rule intent compiler 218 may automatically generate, from alarm intent 130, three alarm rules:

1. If /cpu/usage is above <baseline_threshold> for N out of M monitoring windows then raise alarm for all hosts in the systems
2. If /network/ingress/bit rate is above <baseline_threshold> for N' out of M' monitoring windows then raise alarm for all network devices in the systems
3. If /network/egress/bit rate is above <baseline_threshold> for N' out of M' monitoring windows then raise alarm for all network devices in the systems Alarm rule intent compiler 218 may also perform optimizations in alarm rule generation. For example, alarm rule intent compiler 218 may map new alarm intents to existing alarm intents if an alarm intent exists that can be represented as a function of existing alarm intents. Alarm rule intent compiler 218 may optimize the alarm rules by combining rules. As an example, assume that two alarm intents 230, "Intent1" and "Intent2," have been previously received and processed by alarm rule intent compiler 218 to produce alarm rules "AlarmRuleSet1" and "AlarmRuleSet2" respectively. Next, assume a new alarm intent 230, "Intent3" is received after Intent1 and Intent2 have been processed. Alarm rule intent compiler 218 may detect that Intent3 is a combination of Intent1 and Intent2. For example, Alarm rule intent compiler may detect that Intent3=Intent1+Intent2. In response to detecting that Intent3 is a combination of Intent1 and Intent2, alarm rule intent compiler 230 may generate an alarm rule that is a combination of the rules for Intent1 and Intent2, thereby avoiding generation of a totally new set of alarm rules for Intent3. In this example, alarm rule intent compiler may generate AlarmRuleSet3=AlarmRuleSet1+AlarmRuleSet1. Alarm rules generated by alarm rule intent compiler 218 may be stored as alarm rules 232 in data store 259.

Alarm rule intent programmer 221 receives alarm rules and determines one or more alarm rule execution engines 214 that are to process the alarm rules. Alarm rule intent instance 221 may program mutually exclusive subsets of alarm rules to alarm rule execution engines 214. There may be multiple instances of alarm rule intent programmer 221, where each instance may be allocated a subset of rules. Each alarm rule intent programmer 221 may independently determine the resources that are utilized by the rule and/or need to be created for the rule and to which alarm rule execution engine 214 that a rule is to be posted for processing. In some aspects, alarm rule intent programmer may use an API shown in FIG. 9A to program rules to alarm rules execution engines 214. Parameters used by various functions of the API are shown in FIG. 9B.

Alarm rule execution engines 214 receive telemetry data from network devices 202 and 203, and from host devices 210. Alarm rule execution engines 214 apply the rules for which they have been programmed to the telemetry data and, if the rule is satisfied, generate the corresponding alarm for the rule. In some aspects, alarm rule execution engines 214 receive a stream of telemetry data from a network device 202, 203 or host device 210 and analysis on a sliding window of telemetry data in the telemetry window data stream. As an example, an alarm rule definition may be "if 'average' of 'metric_1' is 'above' 'threshold' over '1 minute' monitoring interval for 3 out of the last 5 monitoring intervals then raise alarm." After sliding window analysis, if the conditions for the alarm rule are met, and alarm can be generated.

Alarm notification subscription service 208 provides an interface for applications (e.g., any of applications 226A, 226B, . . . , 226N etc.) to notify the alarm service 140 that the application wishes to receive notifications of alarms. The application can specify the alarms or type of alarms for which the application is interested in receiving notifications. In some aspects, there may be multiple end-user applications, management applications, and services that are interested in receiving real-time and historical alarm notifications. There may be multiple instances of subscription service consists 208 that can concurrently serve a large number of applications. In case of failure of an instance of subscription service 208, the subscription requests on the failed instance can be reassigned to other available instances of subscription service 208. New subscription service 208 instances can be automatically spawned in case an existing instance fails.

Data store 259 may represent any suitable data structure or storage medium for storing information related to configuring and processing alarms and telemetry, including storage of rules 232 and alarm history 234. Data store 259 may be responsible for storing data in an indexed format, enabling fast data retrieval and execution of queries. The information stored in data store 259 may be searchable and/or categorized such that one or more modules within alarm service 140 may provide an input requesting information from data store 259, and in response to the input, receive information stored within data store 259. Data store 259 may be implemented through multiple hardware devices, and may achieve fault tolerance and high availability by sharding and replicating data.

Figure 3:
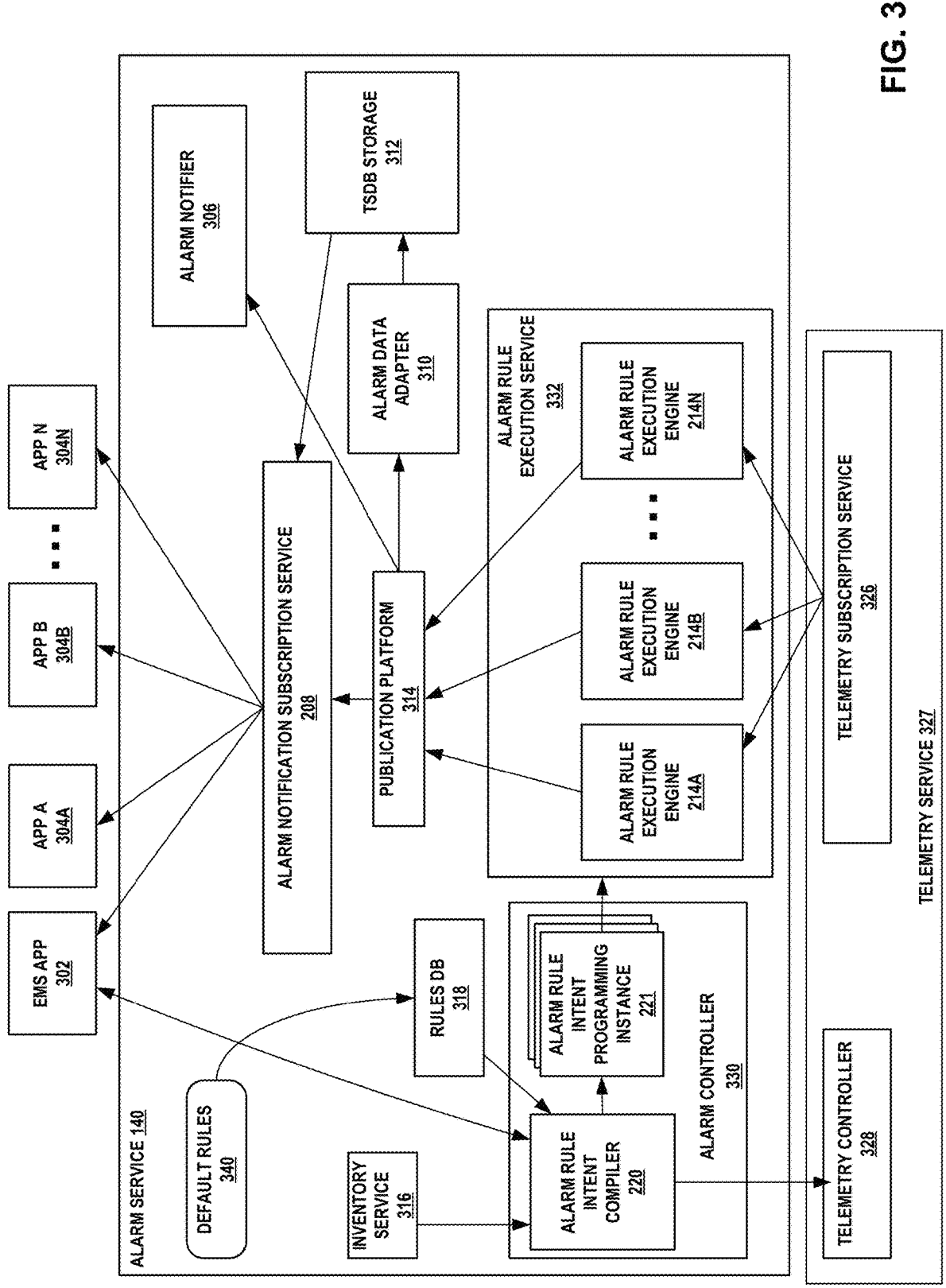
FIG. 3 is a block diagram illustrating further details of an alarm service, in accordance with one or more aspects of the present disclosure.

FIG. 3 is a block diagram illustrating further details of an alarm service, in accordance with one or more aspects of the present disclosure. As shown in FIG. 3, alarm service 140 includes components described above with respect to FIG. 2, that is, alarm rule intent compiler 218, alarm rule programmer 221, alarm rule execution engines 214, and alarm notification subscription service 208. In addition, as shown in FIG. 3, alarm service 140 includes inventory service 316, alarm controller 330, alarm rule execution service 332, publication platform 314, alarm data adapter 310, and alarm notifier 306.

Inventory service 316 can provide information about network resources that are available for a network 205. Such information can include the network devices, host devices, services, etc. that are coupled to the network, and the status of such resources.

Alarm controller 330 can register devices with a network telemetry service to initiate collection of telemetry data for the devices and metrics that are specified in alarm rules generated by alarm rule intent compiler 218. In some aspects, alarm controller 330 can select an appropriate protocol to use to collect the telemetry data from a device. For example, alarm controller 330 may select a protocol based on network or data management protocols supported by the device using information obtained from the device or from inventory service 316.

An application such as an Element Management Service (EMS) application 302 may provide an alarm intent 230 to alarm rule intent compiler 218. For example, a network administrator may provide an alarm intent 230 via EMS application 302.

After alarm rule intent compiler 218 compiles an alarm intent 230 into one or more rules, alarm controller 330 can provision telemetry collectors that can collect the desired telemetry data from the devices specified in the rules generated from the alarm intent. In some aspects, alarm controller can issue a request to telemetry controller 328 to provision telemetry collectors. In order to provision telemetry collectors, a set of sensors and protocols can be determined which can be used by the telemetry collector to collect desire telemetry data from devices. In some aspects, alarm controller 330 can query a telemetry service 327 about its capabilities for telemetry collection. Once capabilities of telemetry collectors are determined, then alarm service 140 can request the appropriate telemetry protocol and sensor(s). In some aspects, when the same metric can be collected using multiple telemetry protocols such as Simple Network Management Protocol (SNMP), Google Remote Procedure Calls (gRPC), Junos Telemetry Interface (JTI) etc., then priority can be given to streaming based telemetry protocols over polling based protocols.

In some aspects, telemetry service 327 can use heuristics to select the most appropriate protocol for collecting desired metrics for the alarm service 140 based on the current load on different collectors. For example, the telemetry service may select a telemetry protocol collector that has the least load at present.

It is possible that more than one alarm rule may specify the same metric. In such cases, a telemetry collector will be provisioned only once to collect the desired metric. A single stream of metric data will be received by alarm rule execution engines 214 and rules in the alarm rule execution engines that utilize the same metric may be executed concurrently.

In some aspects, when alarm rules are deleted and there are no more rules interested in receiving the data for desired metric then telemetry collectors for the metric can be deprovisioned so as to not collect the formerly desired metric.

Further details on telemetry service 327, including telemetry controller 328 and telemetry subscription service 326, may be found in co-filed, co-pending U.S. patent application Ser. No. 16/947,930, entitled "INTENT BASED TELEMETRY COLLECTION SERVICE", which is hereby incorporated by reference.

In some aspects, alarm controller 330 can manage multiple instances of alarm rule intent compiler 218 and alarm rule programmer 221. For example, multiple alarm intents can be concurrently processed and translated to a set of alarm rules that are designed to meet the alarm intent. If an alarm rule compiler instance 218 fails, then a new instance for alarm rule intent compiler 218 can be spawned to meet a desired workload. Alarm controller 330 can reassign current workload of failed instances to the available pool of alarm rule intent compiler 218 instances that are in a good state.

Alarm rule execution service 332 manages instances of alarm rule execution engines 214. For example, alarm rule execution service 332 may create and delete instances of alarm rule execution engines 214 as needed to maintain performance goals and/or resource usage goals. As discussed above, each execution engine 214 can be assigned alarm rules for a specific set of network devices. Upon receiving a rule to process, alarm rule execution engine 214 may subscribe to the telemetry data by issuing a subscription request to telemetry subscription service 326. It is possible that instances of an execution engine 214 can crash. Alarm rule execution service 332 can reallocate the alarm rules of the failed service to other available alarm rule execution engine instances 214. New instances of alarm rule execution engine 214 may be spawned automatically in case existing instances fail.

Publication platform 314 publishes alarms to the applications (e.g., applications 304A-304N, collectively "applications 304") that have subscribed to alarms. In some aspects, publication platform 314 provides alarm data to alarm notification subscription service 208, alarm data adapter 310 and alarm notifier 306. FIG. 10 illustrates an example of an API that may be used by applications 304 to subscribe to an alarm, unsubscribe from an alarm, get alarm data, and modify an alarm subscription.

Alarm data adapter 310 can persist alarm notifications into a persistent storage, e.g., time series database (TSDB) 312. TSDB 312 may, in some aspects, be implemented using a ClickHouse database or an InfluxDB database, It is possible that the same metric data can be collected by different telemetry protocols such as Simple Network Management Protocol (SNMP), Google Remote Procedure Calls (gRPC), Junos Telemetry Interface (JTI) etc. However, when an alarm notification is generated, output results may be translated into a consistent normalized representation for use by applications 304. An example of an alarm rule notification that has been normalized is presented in FIG. 8.

In some aspects, there may be multiple instances of the alarm data adapter 310 that receive alarm notifications for the set of rules for disjoint sets of network devices. In the case that an instance of alarm data adapter 310 crashes, other available instances of the service can be to process the workload of the failed instance. A new instance of alarm data adapter 310 can be automatically spawned in the case that an older instance crashes.

Alarm notifier 306 can notify a subscribing application 304 of an alarm via a notification channel established between the alarm notifier 306 and the subscribing application 304. In some aspects, the notification channel can be a gRPC streaming channel, a slack application, an interprocess communication mechanism etc. Alarm notifier 306 can identify the metric and specific resource for which the notification is generated. A set of labels may be present that provides the context for the alarm notifications. Labels can be added dynamically to include metadata information about the metric data for which alarm rule notifications are generated.

In some aspects, alarm service 140 may monitor itself to facilitate fault tolerance and dynamic scaling. For example, alarm service 140 may monitor resource utilization such as processor and memory usage along with other metrics such as queue size which may be specific to a particular component of the alarm service. The alarm service may periodically or continuously monitor health metrics that can indicate if alarm service 140 is becoming bottleneck for a given load, thereby causing a new instance of the component that has become a bottleneck to be spawned (e.g., created). In some aspects, a set of rules may be defined to monitor the health metrics for a given service and are then used to make decisions for creating new microservice instances for scaling up alarm service capability. Similarly, the same mechanism is used to determine if load conditions are low enough to allow scaling down alarm service capability. FIG. 11 illustrates rules and health metrics that can be used for scaling up or down various components and services of alarm service 140.

In some aspects, one or more of the services described above that are part of alarm service 140, e.g., alarm rule intent compiler 218, alarm rule programmer 221, alarm rule execution engines 214, alarm notification subscription service 208, inventory service 316, alarm controller 330, alarm rule execution service 332, publication platform 314, alarm data adapter 310, and alarm notifier 306 can be implemented as a microservice. For example, the microservices that make up alarm service 140 may be loosely coupled with one or more other microservices of alarm service 140 and may implement lightweight protocols to communicate between microservices.

In some aspects, one or more of the services described above may be implemented as Kubernetes deployment constructs, including pods and containers.

Alarm service 140 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, alarm service 140 represents a cloud computing system, server farm, and/or server cluster (or portion thereof) that provides services to client devices and other devices or systems. In other examples, alarm service 140 may represent or be implemented through one or more virtualized compute instances (e.g., virtual machines, containers) of a data center, cloud computing system, server farm, and/or server cluster.

For ease of illustration, only a limited number of devices (e.g., user interface devices 129, spine devices 202, leaf devices 203, host devices 210, alarm service 140, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

Modules illustrated in FIGS. 2 and 3 (e.g., components of alarm service 140 and/or host devices 210) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Figure 4:
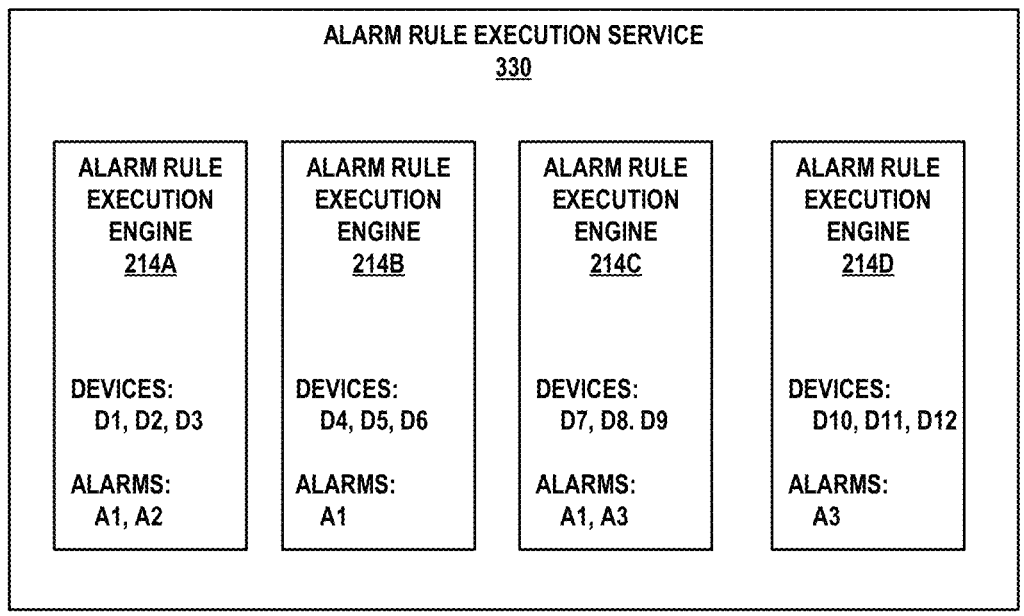
FIG. 4 is a conceptual diagram illustrating an example allocation of alarms and network devices to alarm rule execution engines in accordance with one or more aspects of the present disclosure.

FIG. 4 is a conceptual diagram illustrating an example allocation of alarms and network devices to alarm rule execution engines in accordance with one or more aspects of the present disclosure. In the example illustrated in FIG. 4, alarm execution rule service 332 includes four instances of alarm rule execution engine, 214A, 214B, 214C and 214D.

There are twelve network devices in the example, D1-D12 allocated evenly across alarm rule execution engines 214A-214D. Table 402 illustrates the allocation of alarm rules and network devices to alarm rule execution engines in this example. An alarm rule (A1) instance is created for network devices D1, D5, D7, D8. As shown in FIG. 4 and table 402, device D1 is allocated to alarm rule execution engine 214A, device D5 is allocated to alarm rule execution engine 214B and devices D7, D8 are allocated to alarm rule execution engine 214C. Hence, alarm A1 is assigned to alarm rule execution engines 214A, 214B and 214C for alarm rule processing. Alarm rule A2 only applies to device D2, thus alarm rule A2 is only allocated to alarm rule execution engine 214A. Alarm rule A3 applies to devices D7, D8, D10 and D11 and is allocated to alarm rule execution engines 214C and 214D.

In some aspects, alarm rule programmer 221 is configured to allocate all the rules for a given network device to the same instance of alarm rule execution engine 214. Such an allocation can facilitate distributing the load of alarm rule processing across multiple instances of alarm rule execution engines 214, thereby resulting in a horizontally stable alarm service 140.

During the lifetime of an alarm rule, the rule may transition through different states. The states may depend on an alarm mode. In some aspects, alarm service 140 supports two alarm modes, an event mode and an alert mode. In event mode, alarm notification subscription service 208 can send periodic alarm notifications for as long as conditions satisfying the alarm rule persists. In alert mode, alarm notification subscription service 208 can send an alarm notification when there is a transition in alarm status. For example, when the alarm rule conditions are satisfied, then alarm notification subscription service 208 can send an 'active' notification. No further notifications will be sent as long as the alarm rule conditions stay the same. If alarm rule conditions are no longer met, alarm notification subscription service 208 can send an "inactive" notification. Thus, alert mode may be less "noisy" than event mode.

Figure 5:
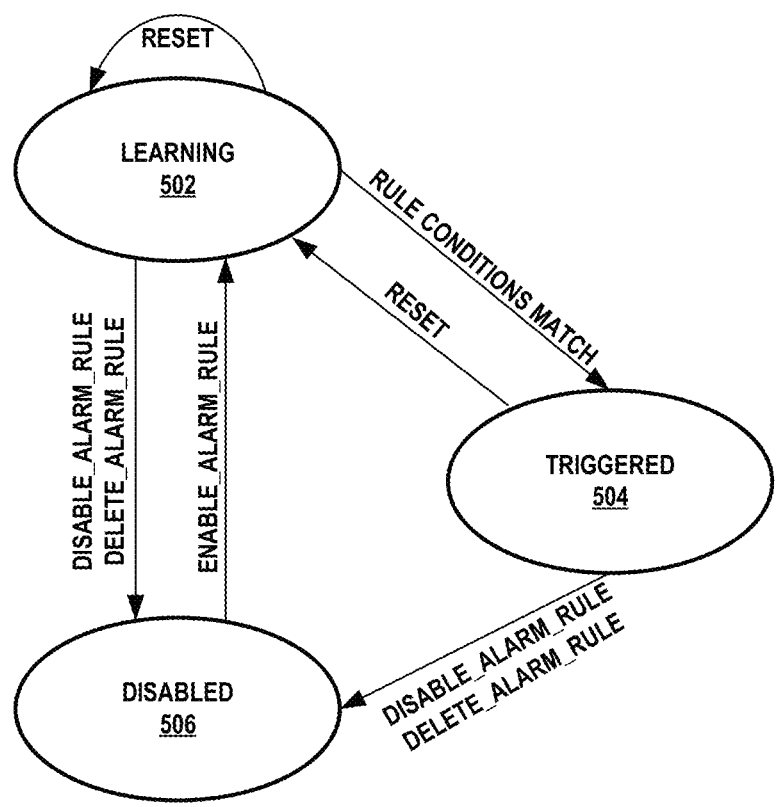
FIG. 5 is a conceptual diagram illustrating an event mode alarm rule state machine in accordance with one or more aspects of the present disclosure.

FIG. 5 is a conceptual diagram illustrating an event mode alarm rule state machine in accordance with one or more aspects of the present disclosure. When an event rule is configured, the initial state may be set to learning state 502. Also, when an event rule is reset, the state may revert to learning state 502. When telemetry data matches an event rule, event output is logged, and the state of the event rule may be set to triggered 504. The log of the event can include information that identifies the rule for which event is fired and specific conditions that are met for the notification. The notification may include a summary of potentially anomalous time series samples that were observed during rule processing. The triggered state 504 is an indicator that the rule match criteria was met at a particular instant, and thus the rule fired. When an event rule is deleted or explicitly disabled, rule matching is not performed, and the event rule state may be set to disabled 506.

Figure 6:
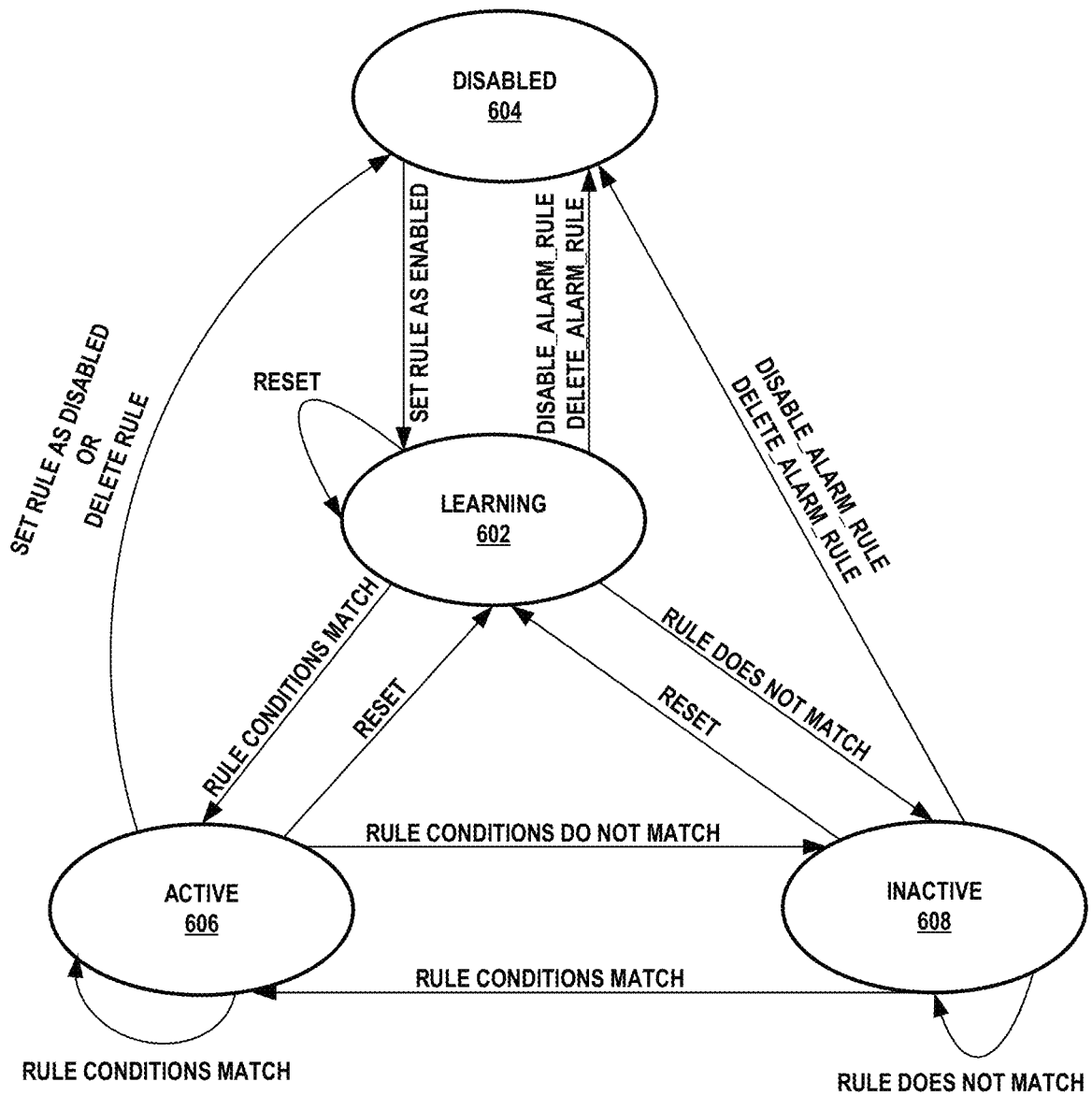
FIG. 6 is a conceptual diagram illustrating an alert mode alarm rule state machine in accordance with one or more aspects of the present disclosure.

FIG. 6 is a conceptual diagram illustrating an alert mode alarm rule state machine in accordance with one or more aspects of the present disclosure. When an alert rule is configured, the initial state of the alert rule may be set to learning 602. When an alert rule is explicitly disabled or deleted, the alert rule may be set to a state of disabled 604. When an alert rule is explicitly enabled, the state of the alert rule may be set to learning 602. When in the learning state 602, if telemetry data matches the rule criteria, the alert rule state may be set to active 606 and output may be logged. In some aspects, a rule may state in the active 606 state for as long as the telemetry data continues to match the rule criteria. When in the active 606 state, if a rule continues to match and metadata changes, an additional alert may be logged with the updated metadata, and the alert rule state may remain as active 606. For example, a rule R1 may be active because two interfaces, Interface1 and Interface2 are down. Later, rule R1 may be active because another interface, Interface3 is down in addition to Interface1 and Interface2. In such cases, the metadata has changed, and an additional notification may be sent to indicate that the rule R1 is still active, but the reason for activation may have changed. If telemetry data does not match the rule criteria, the output may be logged with an alert rule state of inactive 608. The alert rule may remain in the inactive 608 state until telemetry data matches the rule criteria. In any state except for disabled 604, if the alert rule is reset, the state of the alert rule may be set to learning 602.

Figure 7:
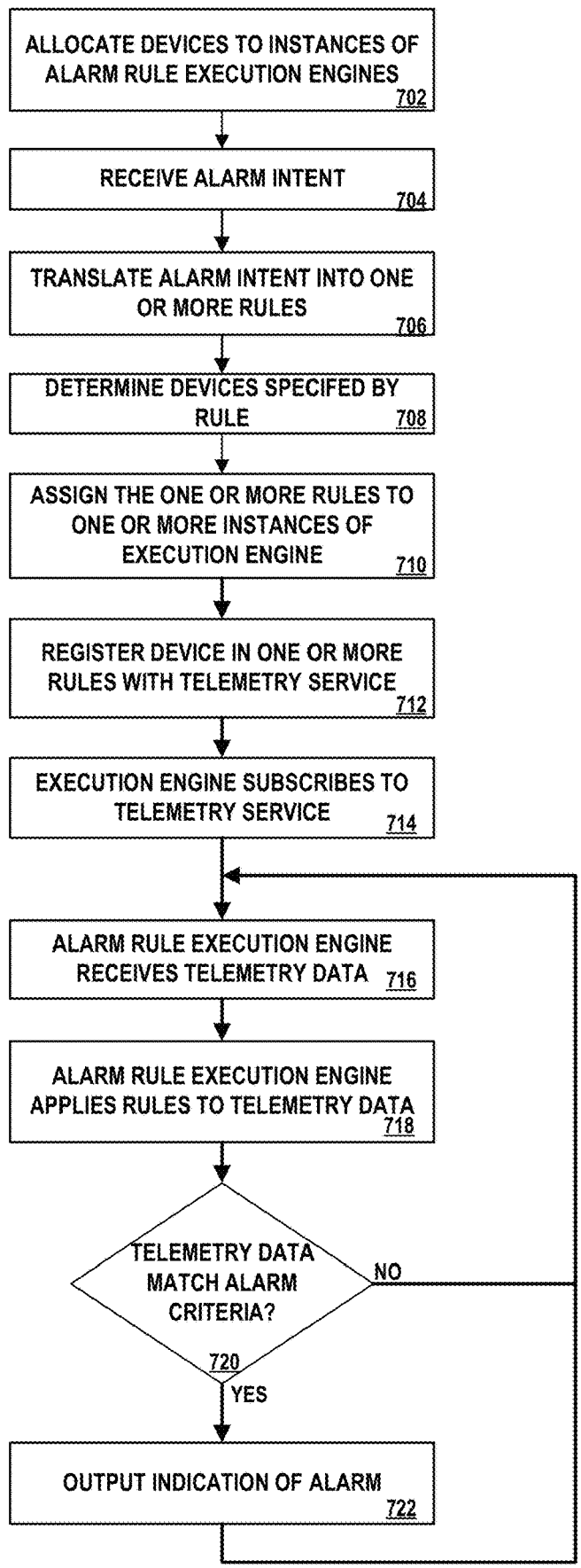
FIG. 7 is a flow diagram illustrating operations performed by an example alarm service in accordance with one or more aspects of the present disclosure.

FIG. 7 is a flow diagram illustrating operations performed by components of an example alarm service 140 in accordance with one or more aspects of the present disclosure. FIG. 7 is described herein within the context of alarm service 140 of FIGS. 1, 2 and 3. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described. The techniques described in FIG. 7 may be used to facilitate an alarm service that is easy to configure and is scalable.

In some aspects, devices are allocated to instances of an alarm rule execution engine (702). The devices may be allocated evenly or by another suitable heuristic.

An application, such as an EMS application 302 (FIG. 3), may provide an alarm intent with respect to an alarm to be provisioned by an alarm service (704). As described above, an alarm intent may be a high level description of an alarm. An alarm rule intent compiler of the alarm service can translate the alarm intent into one or more rules that may include specific telemetry data, criteria associated with the data, and devices that the alarm is to apply to (706). The one or more rules can be designed to implement the alarm intent received by the alarm service.

The alarm service may determine devices associated with or specified by the rules generated at 706 (708).

The rules generated by the alarm rule intent compiler can be provided to one or more instances of an alarm rule programmer. The alarm rule programmer can assign the rules to one or more instances of an alarm rule execution engine (710). In some aspects, the alarm rule programmer assigns rules based on devices associated with instances of the alarm rule execution engine so as to allocate all rules that are associated with the same device to the same alarm rule execution engine. Further, alarm rules may be allocated to an alarm rule execution engine based on the load currently experienced by the alarm rule execution engine. For example, a rule may be allocated to an alarm rule execution engine that has a relatively lighter load.

Multiple rules can be allocated to the same alarm rule execution engine. The same rule may be allocated to different execution engine instances each focused on alarm processing for a specific subset of network devices for a given rule.

An alarm rules controller can register devices specified in the one or more rules with a telemetry service to start collecting telemetry data for the metrics specified in the one or more rules (712). In some aspects, the alarm rule controller selects an appropriate protocol to register along with the device.

The alarm rule execution engine(s) 214, upon receiving a rule, can subscribe to a telemetry subscription service for receiving desired telemetry for the alarm rules allocated to the alarm rule execution engine (714). The alarm rule execution engine(s) 214 begin receiving telemetry data for metrics that the alarm rule execution engine has subscribed to (716).

Each instance of alarm rule execution engine 214 processes the rules assigned to the instance (718), and determines if the telemetry data matches the criteria specified in the one or more rules that define an alarm (718). In some aspects, an alarm rule execution engine 214 performs a sliding window analysis with respect to the telemetry data and the rule criteria. For example, the alarm rule execution engine may determine if the telemetry data matches rule criteria over a window of time that progresses (e.g., slides) as time passes. The alarm associated with the rules can be triggered if the telemetry data matches the rule criteria for all or a specified portion of the sliding window.

If the telemetry data matches the criteria specified by the alarm rules ("YES" branch of 720), the alarm service outputs an indication of the alarm. For example, the alarm service may notify subscribing applications of the alarm condition. The alarm rule execution engine 214 can then wait to receive further telemetry data to be processed according to the rules (return to 716)

If the telemetry data does not match the criterial specified by the alarm rules ("NO" branch of 720), alarm rule execution engine can wait for the arrival of further telemetry data to be processed according to the rules (return to 716).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Further, one or more modules or components may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Also, one or more devices or components that may be illustrated in various Figures herein may alternatively be implemented as part of another device or component not shown in such Figures. In this and other ways, some of the functions described herein may be performed via distributed processing by two or more devices or components.

Each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   allocating, by one or more processors, each device of a plurality of devices to a corresponding instance of a plurality of instances of an alarm rule execution engine;
   obtaining, by one or more processors, data representing an alarm intent;
   translating, by the one or more processors, the data representing the alarm intent into a rule, the rule specifying alarm criteria for an alarm;
   determining, by the one or more processors, a set of one or more devices of the plurality of devices that are specified by the rule,
   for each device in the set of one or more devices, assigning, by the one or more processors, the rule to the instance of the plurality of instances of the alarm rule execution engine corresponding to the device, wherein the instance of the alarm rule execution engine is configured to apply the rule to telemetry data received from the device;
   in response to determining, by the instance of the plurality of instances of the alarm rule execution engine corresponding to the device, that the telemetry data matches the alarm criteria for the rule, outputting an indication of the alarm corresponding to the rule;
   registering the set of one or more devices specified by the rule with a telemetry service, wherein the telemetry service configures the set of one or more devices to provide telemetry data in response to the registering; and
   for at least one device in the set of one or more devices, subscribing, by the instance of the plurality of instances of the alarm rule execution engine corresponding to the at least one device, to the telemetry service to obtain the telemetry data for the at least one device.

2. The method of claim 1, wherein translating the data representing the alarm intent comprises determining that the set of one or more devices are to be associated with the rule and generating the rule to specify the set of one or more devices.

3. The method of claim 1, wherein translating the data representing the alarm intent comprises:
   in response to determining that the alarm intent is a combination of a first alarm intent and a second alarm intent, generating the rule as a combination of one or more first rules translated from the first alarm intent and one or more second rules translated from the second alarm intent.

4. The method of claim 1, further comprising:
   in response to determining that the instance of the plurality of instances of the alarm rule execution engine corresponding to the device has failed, reassigning the rule to a different instance of the plurality of instances of the alarm rule execution engine.

5. The method of claim 1, further comprising:
   for each device in the set of one or more devices, provisioning a telemetry collector for the device.

6. The method of claim 5, wherein provisioning the telemetry collector for the device comprises selecting a protocol for receiving the telemetry data from the device.

7. The method of claim 6, wherein selecting the protocol for receiving the telemetry data comprises selecting the protocol based on a resource load associated with the protocol.

8. The method of claim 6, wherein the device implements a streaming protocol and a polling protocol, and wherein selecting the protocol for receiving the telemetry data comprises selecting the streaming protocol.

9. The method of claim 1, wherein determining, based on the rule, that the telemetry data matches the alarm criteria comprises performing a sliding window analysis on a telemetry data stream of the telemetry data received from the device.

10. An alarm service system comprising:
an alarm controller comprising processing circuitry configured to allocate each device of a plurality of devices to a corresponding instance of a plurality of instances of an alarm rule execution engine;
an alarm intent compiler comprising processing circuitry configured to:
obtain data representing an alarm intent,
translate the data representing the alarm intent into a rule, the rule specifying alarm criteria an alarm, and
determine a set of devices of the plurality of devices that are specified by the rule;
an alarm rule programmer comprising processing circuitry configured to, for each device in the set of one or more devices, assign the rule to the instance of the plurality of instances of the alarm rule execution engine corresponding to the device,
wherein the instance of the plurality of instances of the alarm rule execution engine corresponding to the device is configured to:
receive telemetry data from the device,
apply the rule to the telemetry data, and
in response to a determination that the telemetry data matches the alarm criteria for the rule, output an indication of the alarm;
a telemetry service, wherein the alarm controller is further configured to register the set of one or more devices specified by the rule with the telemetry service, wherein the set of one or more devices provides the telemetry data in response to the registration; and
wherein, for at least one device in the set of one or more devices, subscribing, by the instance of the plurality of instances of the alarm rule execution engine corresponding to the at least one device, to the telemetry service to obtain the telemetry data for the at least one device.

11. The alarm service system of claim 10, wherein to translate the data representing the alarm intent, the alarm intent compiler is configured to:
determine that the set of one or more devices are to be associated with the rule; and
generate the rule to specify the set of one or more devices.

12. The alarm service system of claim 10, wherein to translate the data representing the alarm intent, the alarm intent compiler is configured to:
in response to a determination that the alarm intent is a combination of a first alarm intent and a second alarm intent, generate the rule as a combination of one or more first rules translated from the first alarm intent and one or more second rules translated from the second alarm intent.

13. The alarm service system of claim 10, wherein the alarm controller is further configured to, for each device in the set of one or more devices, provision a telemetry collector for the device.

14. The alarm service system of claim 13, wherein to provision the telemetry collector for the device, the alarm control is configured to select a protocol for receiving the telemetry data from the device.

15. The alarm service system of claim 10, wherein the plurality of devices include one or more network devices and one or more host devices.

16. A non-transitory computer-readable storage medium comprising instructions that, when executed, cause processing circuitry of a computing system to:
allocate each device of a plurality of devices to a corresponding instance of a plurality of instances of an alarm rule execution engine;
obtain data representing an alarm intent;
translate the data representing the alarm intent into a rule, the rule specifying alarm criteria for an alarm;
determine a set of one or more devices of the plurality of devices that are specified by the rule,
for each device in the set of one or more devices, assign the rule to the instance of the plurality of instances of the alarm rule execution engine corresponding to the device, wherein the instance of the alarm rule execution engine is configured to apply the rule to telemetry data received from the device;
in response to a determination, by the instance of the plurality of instances of the alarm rule execution engine corresponding to the device, that the telemetry data matches the alarm criteria for the rule, outputting an indication of the alarm corresponding to the rule;
register the set of one or more devices specified by the rule with a telemetry service, wherein the telemetry service configures the set of one or more devices to provide telemetry data in response to the registering; and
for at least one device in the set of one or more devices, subscribe, by the instance of the plurality of instances of the alarm rule execution engine corresponding to the at least one device, to the telemetry service to obtain the telemetry data for the at least one device.

* * * * *